US009635092B2

United States Patent
Tang et al.

(10) Patent No.: US 9,635,092 B2
(45) Date of Patent: Apr. 25, 2017

(54) METHOD FOR PROCESSING SHARED FILE AND CLOUD STORAGE SERVER

(71) Applicants: Peking University Founder Group Co., Ltd., Beijing (CN); Beijing Founder Electronics Co., Ltd., Beijing (CN)

(72) Inventors: Shoulin Tang, Beijing (CN); Wenbo Li, Beijing (CN)

(73) Assignees: Peking University Founder Group Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 686 days.

(21) Appl. No.: 14/094,072

(22) Filed: Dec. 2, 2013

(65) Prior Publication Data

US 2015/0067109 A1 Mar. 5, 2015

(30) Foreign Application Priority Data

Aug. 28, 2013 (CN) .......................... 2013 1 0382164

(51) Int. Cl.
*G06F 15/16* (2006.01)
*H04L 29/08* (2006.01)

(52) U.S. Cl.
CPC .......... *H04L 67/06* (2013.01); *H04L 67/1097* (2013.01)

(58) Field of Classification Search
CPC ............................ H04L 67/06; H04L 67/1097
USPC ........................................................ 709/219
See application file for complete search history.

(56) References Cited

U.S. PATENT DOCUMENTS

| 5,878,218 | A | * | 3/1999 | Maddalozzo, Jr. ...................... G06F 17/30067 707/999.01 |
| 6,728,712 | B1 | * | 4/2004 | Kelley .............. H04L 29/12594 707/770 |
| 8,650,159 | B1 | * | 2/2014 | Zhang ............... G06F 17/30194 707/664 |
| 9,063,664 | B1 | * | 6/2015 | Li .......................... G06F 3/0641 |
| 9,213,718 | B1 | * | 12/2015 | Hrebicek ................ H04L 67/06 |
| 2002/0065817 | A1 | * | 5/2002 | Ito ..................... G06F 17/30743 |
| 2003/0126118 | A1 | * | 7/2003 | Burton .................. G06F 17/301 |
| 2011/0087690 | A1 | * | 4/2011 | Cairns ............... G06F 17/30097 707/769 |
| 2012/0078946 | A1 | * | 3/2012 | Darcy ............... G06F 17/30094 707/769 |

(Continued)

*Primary Examiner* — Anthony Mejia
(74) *Attorney, Agent, or Firm* — Leydig, Voit & Mayer, Ltd.

(57) ABSTRACT

The present invention provides a method for processing a shared file and a cloud storage server. The method comprises: receiving, by a cloud storage server, an update request message from a second client; determining that a first file is located within a storage region of a first client according to an identifier of the first file and acquiring current version information of the first file from the storage region of the first client; and if it is determined that the version of the first file on the second client is older than the version of the first file within the storage region of the first client, generating a first download address and transmitting the first download address to the second client, so that the second client downloads the first file in the current version. According to an embodiment of the present invention, it is able to synchronously update the shared file.

12 Claims, 7 Drawing Sheets

(56) References Cited

U.S. PATENT DOCUMENTS

| | | | | |
|---|---|---|---|---|
| 2012/0084665 A1* | 4/2012 | Bookstaff | ......... | G06F 17/30867 715/748 |
| 2012/0166516 A1* | 6/2012 | Simmons | ............ | H04L 67/1095 709/202 |
| 2012/0254108 A1* | 10/2012 | Wedewer | .............. | H04W 4/003 707/618 |
| 2013/0204849 A1* | 8/2013 | Chacko | ................. | G06F 3/0604 707/692 |
| 2013/0238552 A1* | 9/2013 | Saib | ................. | G06F 17/30174 707/609 |
| 2013/0254314 A1* | 9/2013 | Chow | .................... | H04L 67/06 709/206 |
| 2013/0282658 A1* | 10/2013 | Besen | ............... | G06F 17/30215 707/634 |
| 2014/0012949 A1* | 1/2014 | Meyers | ............... | H04L 67/1095 709/217 |
| 2014/0052825 A1* | 2/2014 | Luecke | ................. | H04L 67/327 709/219 |
| 2014/0108508 A1* | 4/2014 | Liu | ....................... | H04L 67/104 709/203 |
| 2014/0201144 A1* | 7/2014 | Vibhor | ................ | H04L 29/0854 707/634 |
| 2014/0229582 A1* | 8/2014 | Liu | ......................... | H04L 67/06 709/219 |
| 2014/0304384 A1* | 10/2014 | Varenhorst | .............. | H04L 67/00 709/223 |
| 2014/0358860 A1* | 12/2014 | Wautier | ............ | G06F 17/30575 707/638 |
| 2015/0142983 A1* | 5/2015 | Yilmaz | ............... | H04L 67/1095 709/227 |

* cited by examiner

METHOD FOR PROCESSING SHARED FILE AND CLOUD STORAGE SERVER

TECHNICAL FIELD

The present invention relates to a cloud storage technology, in particular to a method for processing a shared file and a cloud storage server.

BACKGROUND

Currently, a cloud storage technology mainly remains at a stage where a user manages his own storage space. The user may achieve synchronization between different devices and a cloud storage server. Also, user's files in the cloud storage server may be shared. To be specific, the user may determine the file to be shared and the cloud storage server gives the user an "external link" about the file. Then, the user may provide the other users with this "external link," through which the other users can download the file locally from the user's cloud storage space, so as to share the file.

However, when the shared file is changed in the cloud storage server, the "external link" corresponding to the shared file will be changed too. At this time, the other users cannot download the changed file from the cloud storage server through the original "external link". Therefore, the file locally downloaded by the other users cannot be updated in synchronized with the source file.

SUMMARY

An object of the present invention is to provide a method for processing a shared file and a cloud storage server, so as to synchronously update the shared file.

In one aspect, the present invention provides a method for processing a shared file, comprising:
receiving, by a cloud storage server, an update request message from a second client, the update request message including an identifier of a first file that is requested to be updated and local version information of the first file, the first file being downloaded by the second client from a storage region of a first client;
determining, by the cloud storage server, that the first file is located within the storage region of the first client according to the identifier of the first file, and acquiring current version information of the first file from the storage region of the first client; and
if the cloud storage servers determines, according to the local version information and the current version information of the first file, that the version of the first file on the second client is older than the version of the first file within the storage region of the first client, generating a first download address for the first file and transmitting the first download address to the second client, so that the second client downloads the first file in the current version from the storage region of the first client according to the first download address.

In another aspect, the present invention provides a cloud storage server, comprising:
a first reception module configured to receive an update request message from a second client, the update request message including an identifier of a first file that is requested to be updated and local version information of the first file, the first file being downloaded by the second client from a storage region of a first client;
a first acquisition module configured to determine that the first file is located within the storage region of the first client according to the identifier of the first file received by the first reception module, and acquire current version information of the first file from the storage region of the first client;
a first generation module configured to, if it is determined, according to the local version information of the first file received by the first reception module and the current version information of the first file acquired by the first acquisition module, that the version of the first file on the second client is older than the version of the first file within the storage region of the first client, generate a first download address for the first file; and
a first transmission module configured to transmit the first download address generated by the first generation module to the second client, so that the second client downloads the first file in the current version from the storage region of the first client according to the first download address.

According to the method for processing the shared file and the cloud storage server of the present invention, the second client transmits the identifier of the first file that is requested to be updated and the local version information of the first file to the cloud storage server through the update request message; the cloud storage server determines that the first file is located within the storage region of the first client according to the identifier of the first file, acquires the current version information of the first file from the storage region of the first client, compares the local version information and the current version information of the first file, determines whether the version of the first file on the second client is older than the version of the first file within the storage region of the first client, if yes, generates the download address used for updating the first file and provides it to the second client. As a result, the second client can download the first file in the current version according to the download address, and thereby update the shared file.

DETAILED DESCRIPTION

Figure 1A:
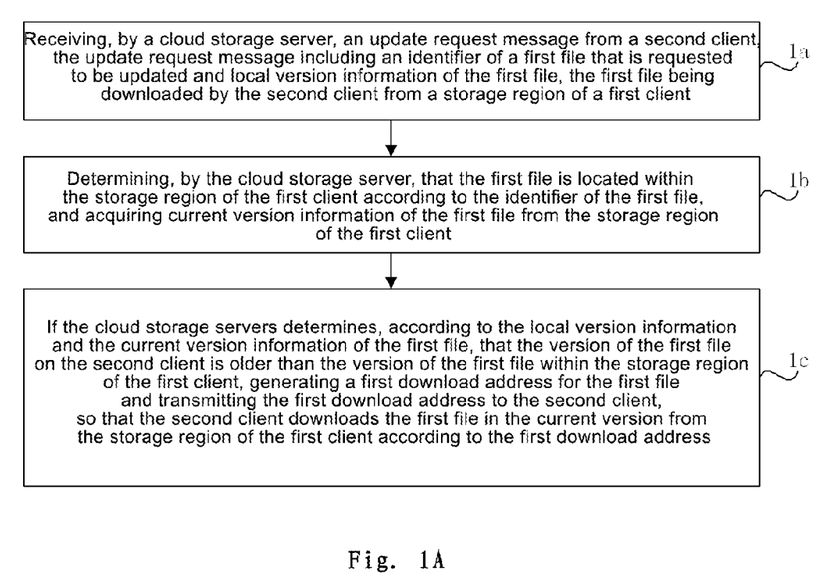
FIG. 1A is a flow chart of a method for processing a shared file according to one embodiment of the present invention.

FIG. 1A is a flow chart of a method for processing a shared file according to one embodiment of the present invention. As shown in FIG. 1A, the method comprises:

Step 1a: receiving, by a cloud storage server, an update request message from a second client, the update request message including an identifier of a first file that is requested to be updated and local version information of the first file, the first file being downloaded by the second client from a storage region of a first client;

Step 1b: determining, by the cloud storage server, that the first file is located within the storage region of the first client according to the identifier of the first file, and acquiring current version information of the first file from the storage region of the first client; and Step 1c: if the cloud storage servers determines, according to the local version information and the current version information of the first file, that the version of the first file on the second client is older than the version of the first file within the storage region of the first client, generating a first download address for the first file and transmitting the first download address to the second client, so that the second client downloads the first file in the current version from the storage region of the first client according to the first download address.

In this embodiment, all the files in the cloud storage system are stored in blocks based on users, and each block of the storage space is just a storage region of a client. The first client will upload its files in advance to the storage region of the first client.

The method provided in this embodiment is mainly used to process the shared file, and the condition where the second client shares the file of the first client is taken as an example. To facilitate the description, the shared file is called as a first file, which may be any file allowed to be shared at the first client.

In this embodiment, the first client uploads in advance the first file to the storage region of the first client, and allows it to be shared by the other clients. The second client locally downloads the first file in advance from the storage region of the first client, so as to share the first file. The procedures of uploading the first file by the first client and downloading the first file by the second client will be described hereinafter. Then, the second client may need to synchronize the first file, so it transmits an update request message to the cloud storage server. The update request message carries the identifier of the first file that is requested to be updated and the local version information of the first file. The identifier of the first file is used to identify the first file, and the local version information of the first file is used to identify the version of the first file downloaded by the second client. Correspondingly, the cloud storage server receives the update request message from the second client, and acquires the identifier of the first file and the local version information of the first file from the update request message.

Next, the cloud storage server determines a storage position of the first file according to the identifier of the first file. When it is determined that the first file is located within the storage region of the first client according to the identifier of the first file, the current version information of the first file is acquired from the storage region of the first client. It is to be noted that, after uploading the first file to the storage region of the first client, the first client may update the first file at any time. The procedure of updating, by the first client, the first file is similar to that in the prior art, i.e., it mainly includes uploading a new first file to overwrite the original first file, and modifying the version information corresponding to the first file.

After the cloud storage server acquires the current version information of the first file, it may compare the local version information of the first file provided by the second client with the acquired current version information of the first file, and determine whether or not the version of the first file on the first client is older than the version of the first file within the storage region of the first client. If yes, the cloud storage server will generate the first download address for the first file, and provide the first download address to the second client. Then, the second client acquires the first file in the current version from the storage region of the first client according to the first download address, so as to update the first file.

It is to be noted that, in order to distinguish these download addresses, the download address used for updating the first file is called as the first download address, and the subsequent download address used for initially downloading the first file is called as the second download address. Because the first file is changed, the first and second download addresses are different from each other.

In this embodiment, the second client transmits the identifier of first file that is requested to be updated and the local version information of the first file to the cloud storage server via the update request message. The cloud storage server determines, according to the identifier of the first file, that the first file is located within the storage region of the first client, and acquires the current version information of the first file from the storage region of the first client. Then, the cloud storage server compares the local version information of the first file with the current version information to determine whether or not the version of the first file on the second client is older than the version of the first file within the storage region of the first client. If yes, it generates the download address used for updating the first file, and provides it to the second client so that the second client can download the first file in the current version according to the download address, thereby to share the file.

Figure 1B:
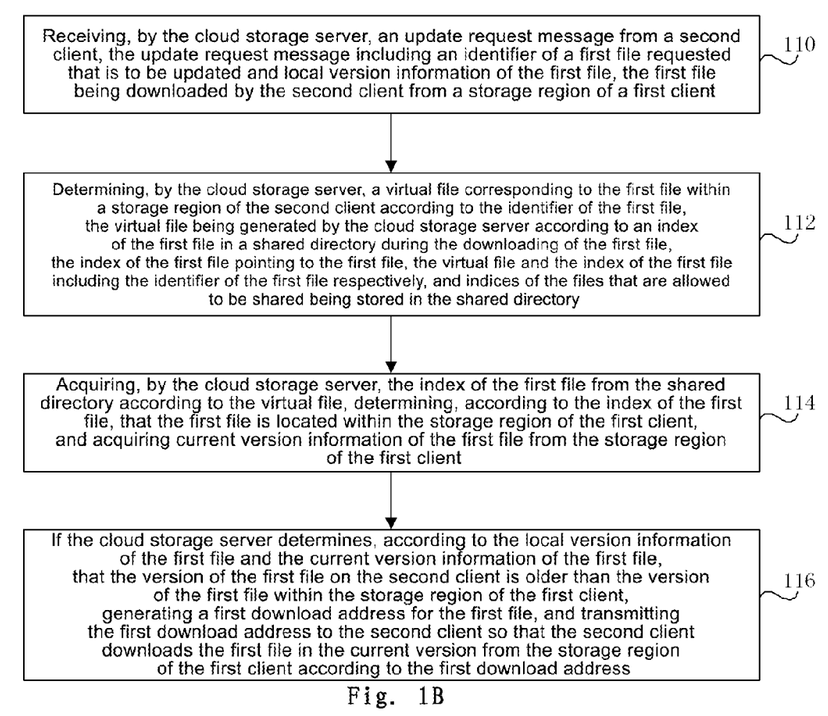
FIG. 1B is a flow chart of another method for processing a shared file according to one embodiment of the present invention.

FIG. 1B is a flow chart of another method for processing a shared file according to one embodiment of the present invention. As shown in FIG. 1B, the method comprises:

Step 110: receiving, by the cloud storage server, an update request message from a second client, the update request message including an identifier of a first file that is requested to be updated and local version information of the first file, the first file being downloaded by the second client from a storage region of a first client;

Step 112: determining, by the cloud storage server, a virtual file corresponding to the first file within a storage region of the second client according to the identifier of the first file, the virtual file being generated by the cloud storage server according to an index of the first file in a shared directory during the downloading of the first file, the index of the first file pointing to the first file, the virtual file and the index of the first file including the identifier of the first file respectively, and indices of the files that are allowed to be shared being stored in the shared directory;

Step 114: acquiring, by the cloud storage server, the index of the first file from the shared directory according to the virtual file, determining, according to the index of the first file, that the first file is located within the storage region of the first client, and acquiring current version information of the first file from the storage region of the first client; and Step 116: if the cloud storage server determines, according to the local version information of the first file and the current version information of the first file, that the version of the first file on the second client is older than the version of the first file within the storage region of the first client, generating a first download address for the first file, and transmitting the first download address to the second client so that the second client downloads the first file in the current version from the storage region of the first client according to the first download address.

It is to be noted that, Steps 112 and 114 in this embodiment may serve as, but not limited to, specific steps for performing step 1b as shown in FIG. 1A.

In this embodiment, all the files in the cloud storage system are stored in blocks based on users, and each block of the storage space is just a storage region of a client. The first client uploads its files in advance to the storage region of the first client, and the cloud storage server sets a shared directory for storing the indices of the files allowed to be shared in the entire cloud storage system. Each index of a file points to the file, and includes an identifier (ID) thereof. For example, the index of the file includes, apart from the identifier of the file, the information such as a name, a storage address and a size of the file.

The method provided in this embodiment is mainly used to process the shared file, and the condition where the second client shares the file of the first client is taken as an example. To facilitate the description, the shared file is called as a first file, which may be any file allowed to be shared at the first client.

In this embodiment, the first client uploads in advance the first file to the storage region of the first client, and allows it to be shared by the other clients. The second client locally downloads the first file in advance from the storage region of the first client, so as to share the first file. The procedures of uploading the first file by the first client and downloading the first file by the second client will be described hereinafter. Then, the second client may need to synchronize the first file, so it transmits the update request message to the cloud storage server. The update request message carries the identifier of the first file that is requested to be updated and the local version information of the first file. The identifier of the first file is used to identify the first file, and the local version information of the first file is used to identify the version of the first file downloaded by the second client. Correspondingly, the cloud storage server receives the update request message from the second client, and acquires the identifier of the first file and the local version information of the first file from the update request message.

Next, the cloud storage server determines a virtual file corresponding to the first file from the storage region of the second client according to the identifier of the first file. During the procedure of downloading the first file by the second client, the cloud storage server will generate the virtual file corresponding to the first file according to the index of the first file in the shared directory. The virtual file and the index of the first file include the identifier of the first file respectively. The virtual file corresponding to the first file is mainly used to enable the cloud storage server to find the index of the first file from the shared directory.

After determining the virtual file corresponding to the first file, the index of the first file is acquired from the shared directory according to the virtual file. Because the index of the first file points to the first file, the storage position of the first file may be determined according to the index of the first file. When it is determined, according to the index of the first file, that the first file is located within the storage region of the first client, the current version information of the first file will be acquired from the storage region of the first client. It is to be noted that, after the first client uploads the first file to the storage region of the first client, it may update the first file at any time. The procedure of updating the first file by the first client is similar to that in the prior art, i.e., it mainly includes uploading a new first file to overwrite the original first file, and modifying the version information corresponding to the first file.

After the cloud storage server acquires the current version information of the first file, it may compare the local version information of the first file provided by the second client with the acquired current version information of the first file, and determine whether or not the version of the first file on the first client is older than the version of the first file within the storage region of the first client. If yes, the cloud storage server will generate the first download address for the first file, and provide the first download address to the second client. Then, the second client will acquire the first file in the current version from the storage region of the first client according to the first download address, so as to update the first file.

It is to be noted that, in order to distinguish these download addresses, the download address used for updating the first file is called as the first download address, and the subsequent download address used for initially downloading the first file is called as the second download address. Because the first file is changed, the first and second download addresses are different from each other.

In this embodiment, the second client transmits the identifier of first file that is requested to be updated and the local version information of the first file to the cloud storage server via the update request message. The cloud storage server, according to the identifier of the first file, determines the virtual file corresponding to the first file from the storage region of the second client, finds the index of the first file from the shared directory storing the indices of the files allowed to be shared according to the virtual file, determines that the first file is located within the storage region of the first client according to the index, and acquires the current version information of the first file from the storage region of the first client. The local version information of the first file is compared with the current version information to determine whether or not the version of the first file on the second client is older than the version of the first file within the storage region of the first client. If yes, the download address used for updating the first file is generated and provided to the second client so that the second client can download the first file in the current version according to the download address, thereby to share the file.

Further, according to the method of this embodiment, the second client provides the local version information of the first file that is requested to be updated to the cloud storage server. The cloud storage server compares the local version information of the first file and the current version information, generates the download address used for updating the first file only when the two pieces of version information are different from each other, and then provides the download address to the second client. The second client directly downloads the first file in the latest version according to the download address, it is not necessary to locally download the first file again at each time and then comparing it with the first file previously downloaded. As a result, it is able to reduce the processing burden of the second client and to improve the efficiency of updating the first file.

Figure 2:
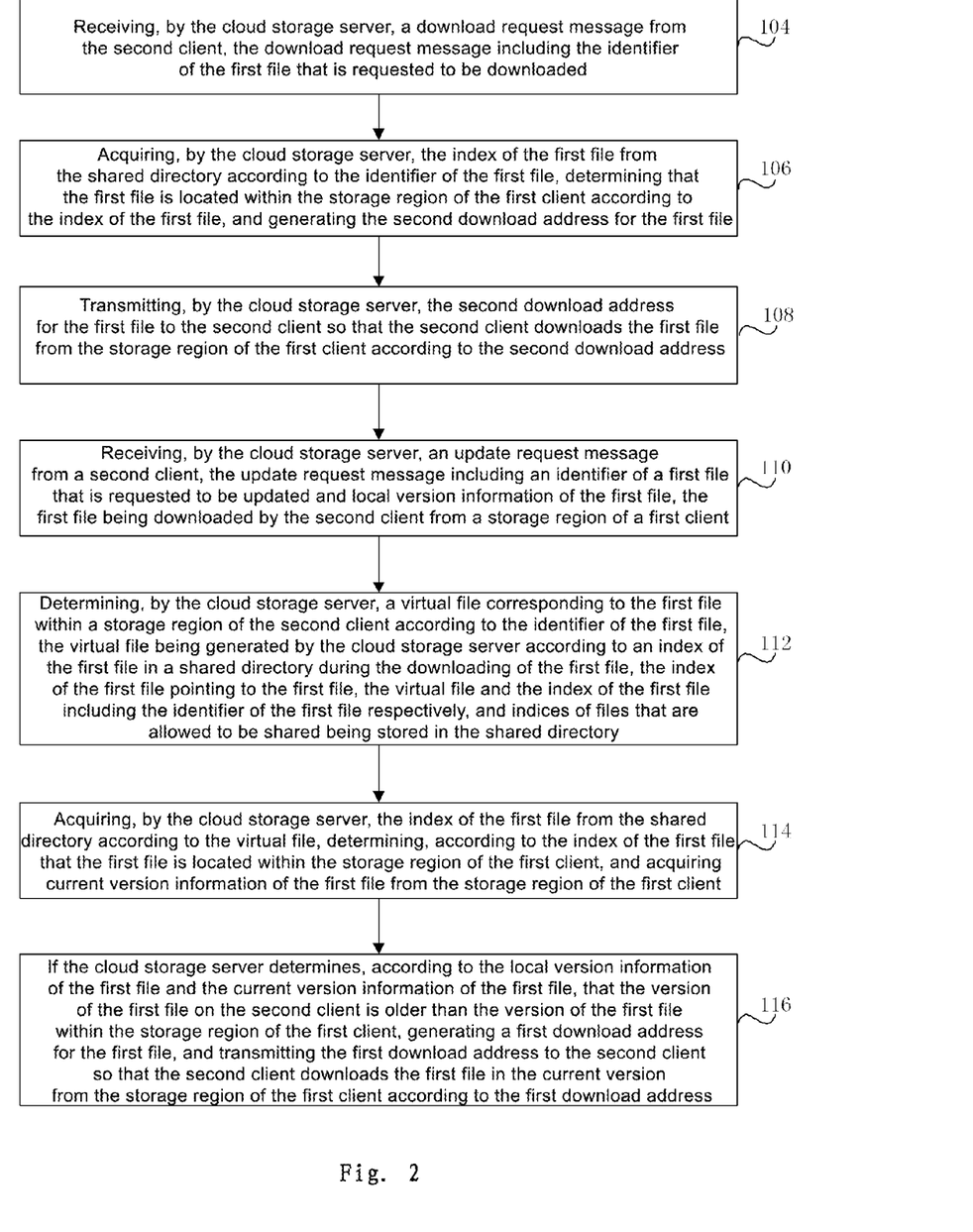
FIG. 2 is a flow chart of yet another method for processing a shared file according to one embodiment of the present invention.

Before requesting to update the first file, the second client needs to download the first file from the storage region of the first client, as shown by steps 104-108 in FIG. 2. Referring to FIG. 2, prior to step 110, the method further comprises the following steps:

Step 104: receiving, by the cloud storage server, a download request message from the second client, the download request message including the identifier of the first file that is requested to be downloaded.

Step 106: acquiring, by the cloud storage server, the index of the first file from the shared directory according to the identifier of the first file, determining that the first file is located within the storage region of the first client according to the index of the first file, and generating the second download address for the first file; and Step 108: transmitting, by the cloud storage server, the second download address for the first file to the second client so that the second client downloads the first file from the storage region of the first client according to the second download address.

In this embodiment, before requesting to update the first file, the second client transmits the download request message to the cloud storage server, and the download request message carries the identifier of the first file that is requested to be downloaded. The cloud storage server receives the download request message from the second client, acquires the identifier of the first file, acquires the index of the first file from the shared directory according to the identifier of the first file, and then determines the storage position of the first file according to the index of the first file. When the cloud storage server determines that the first file is located within the storage region of the first client according to the index of the first file, it generates the second download address for the first file. Here, the second download address indicates the download address used for initially downloading the first file.

Next, the cloud storage server provides the second download address to the second client so that the second client can locally download the first file from the storage region of the first client according to the second download address.

Figure 3:
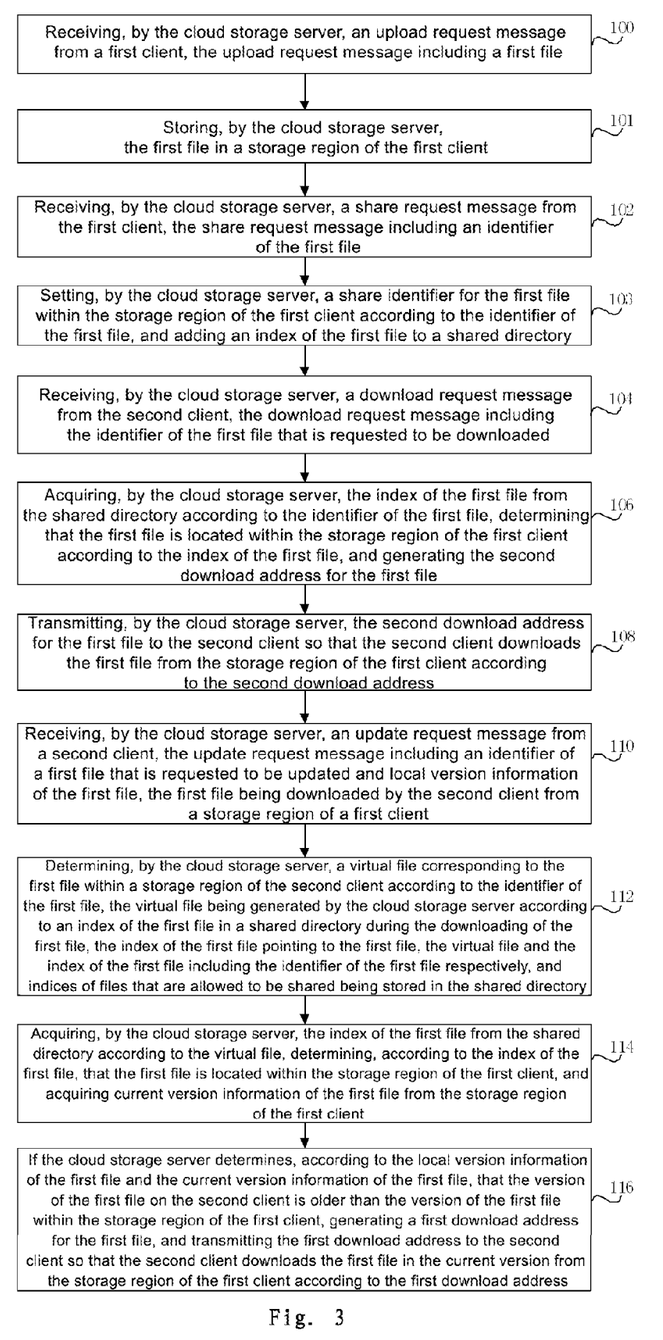
FIG. 3 is a flow chart of yet another method for processing a shared file according to one embodiment of the present invention.

Further, before the second client downloads the first file from the storage region of the first client, the first client needs to upload the first file to the storage region of the first client and set the first file as the share file. For example, the process of the first client uploading the first file to the storage region of the first client is shown by steps 100-103 in FIG. 3. Referring to FIG. 3, prior to step 104, the method further comprises the following steps:

Step 100: receiving, by the cloud storage server, an upload request message from the first client, the upload request message including the first file;

Step 101: storing, by the cloud storage server, the first file in the storage region of the first client;

Step 102: receiving, by the cloud storage server, a share request message from the first client, the share request message including the identifier of the first file; and Step 103: setting, by the cloud storage server, a share identifier for the first file within the storage region of the first client according to the identifier of the first file, and adding the index of the first file to the shared directory.

In this embodiment, before the second client requests to download the first file, the first client transmits the upload request message and the first file carried in the upload request message to the cloud storage server. The cloud storage server receives the upload request message from the first client, acquires the first file therefrom, and stores the first file in the storage region of the first client. It is to be noted that, any types of the files may be uploaded by the first client according to such a procedure.

After the first client uploads the first file to the storage region of the first client, it will transmit a share request message to the cloud storage server if it determines that the first file is the shared file, and carry the identifier of the first file in the share request message so that the cloud storage server knows that the first file is required to be set as the shared file. The cloud storage server receives the share request message from the first client, acquires the identifier of the first file therefrom, determines that the first file is required to be shared according to the identifier of the first file, and sets a share identifier for the first file within the storage region of the first client, so as to identify the first file as the shared file and to distinguish it from other non-shared files. Meanwhile, the cloud storage server adds the index of the first file to the shared directory so as to enable the other clients, e.g., the second client, to download the first file.

Figure 4:
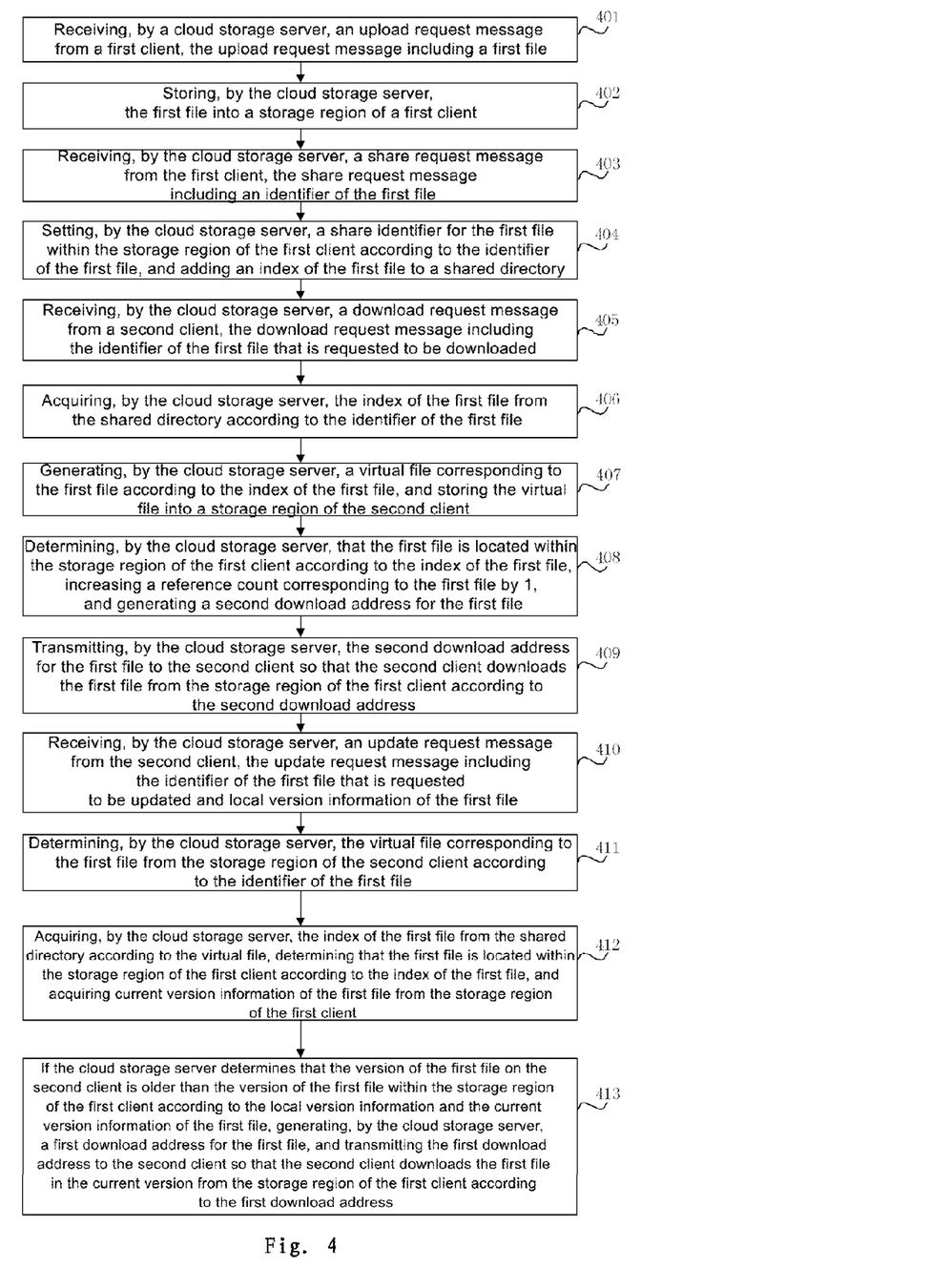
FIG. 4 is a flow chart of yet another method for processing a shared file according to one embodiment of the present invention.

FIG. 4 is a flow chart of another method for processing a shared file according to one embodiment of the present invention. As shown in FIG. 4, the method comprises the following steps.

Step 401: receiving, by a cloud storage server, an upload request message from a first client, the upload request message including a first file.

Step 402: storing, by the cloud storage server, the first file into a storage region of a first client.

Step 403: receiving, by the cloud storage server, a share request message from the first client, the share request message including an identifier of the first file Step 404: setting, by the cloud storage server, a share identifier for the first file within the storage region of the first client according to the identifier of the first file, and adding an index of the first file to a shared directory.

Steps 401-404 are identical to steps 100-103, and the specific procedures will not be repeated herein.

Step 405: receiving, by the cloud storage server, a download request message from a second client, the download request message including the identifier of the first file that is requested to be downloaded.

Step 406: acquiring, by the cloud storage server, the index of the first file from the shared directory according to the identifier of the first file.

Step 407: generating, by the cloud storage server, a virtual file corresponding to the first file according to the index of the first file, and storing the virtual file in a storage region of the second client.

Step 408: determining, by the cloud storage server, that the first file is located within the storage region of the first client according to the index of the first file, increasing a reference count corresponding to the first file by 1, and generating a second download address for the first file.

Step 409: transmitting, by the cloud storage server, the second download address for the first file to the second client so that the second client downloads the first file from the storage region of the first client according to the second download address.

In this embodiment, after the cloud storage server acquires the index of the first file from the shared directory according to the identifier of the first file, it will generate the virtual file corresponding to the first file according to the index of the first file, and store the virtual file in the storage region of the second client so as to facilitate the subsequent updating of the first file by the second client. In addition, after the cloud storage server determines that the first file is located within the storage region of the first client according to the index of the first file, it will increase the reference count corresponding to the first file by 1 and count the clients that share the first files, so as to facilitate the subsequent deletion of the first file.

The other descriptions on steps 405-409 may refer to steps 104-108, and will not be repeated herein.

Step 410: receiving, by the cloud storage server, an update request message from the second client, the update request message including the identifier of the first file that is requested to be updated and local version information of the first file.

Step 411: determining, by the cloud storage server, the virtual file corresponding to the first file from the storage region of the second client according to the identifier of the first file.

Step 412: acquiring, by the cloud storage server, the index of the first file from the shared directory according to the virtual file, determining that the first file is located within the storage region of the first client according to the index of the first file, and acquiring current version information of the first file from the storage region of the first client.

Step 413: if the cloud storage server determines that the version of the first file on the second client is older than the version of the first file within the storage region of the first client according to the local version information and the current version information of the first file, generating, by the cloud storage server, a first download address for the first file, and transmitting the first download address to the second client so that the second client downloads the first file in the current version from the storage region of the first client according to the first download address.

The other descriptions on steps 410-413 may refer to steps 110-116, and will not be repeated herein.

In this embodiment, the cloud storage server adds the index of the first file to the shared directory during uploading the first file by the first client, and generates the virtual file corresponding to the first file according to the index of the first file and stores it in the storage region of the second client during downloading the first file by the second client. The second client transmits the identifier of the first file that is requested to be updated and the local version information of the first file to the cloud storage server through the update request message. The cloud storage server determines the virtual file corresponding to the first file from the storage region of the second client according to the identifier of the first file, finds the index of the first file from the shared directory storing the indices of the files allowed to be shared according to the virtual file, determines that the first file is located within the storage region of the first client according to the index, and acquires the current version information of the first file from the storage region of the first client. Then the cloud storage server compares the local version information of the first file with the current version information and determines whether or not the version of the first file on the second client is older than the version of the first file within the storage region of the first client. If yes, it generates the download address used for updating the first file, and provides it to the second client so that the second client can download the first file in the current version according to the download address, thereby to achieve the update of the shared file.

Figure 5:
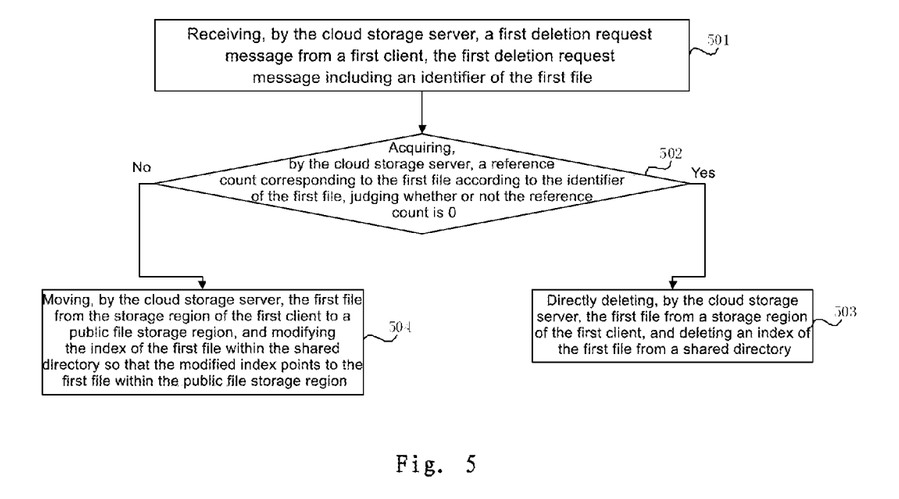
FIG. 5 is a flow chart of yet another method for processing a shared file according to one embodiment of the present invention.
Figure 6:
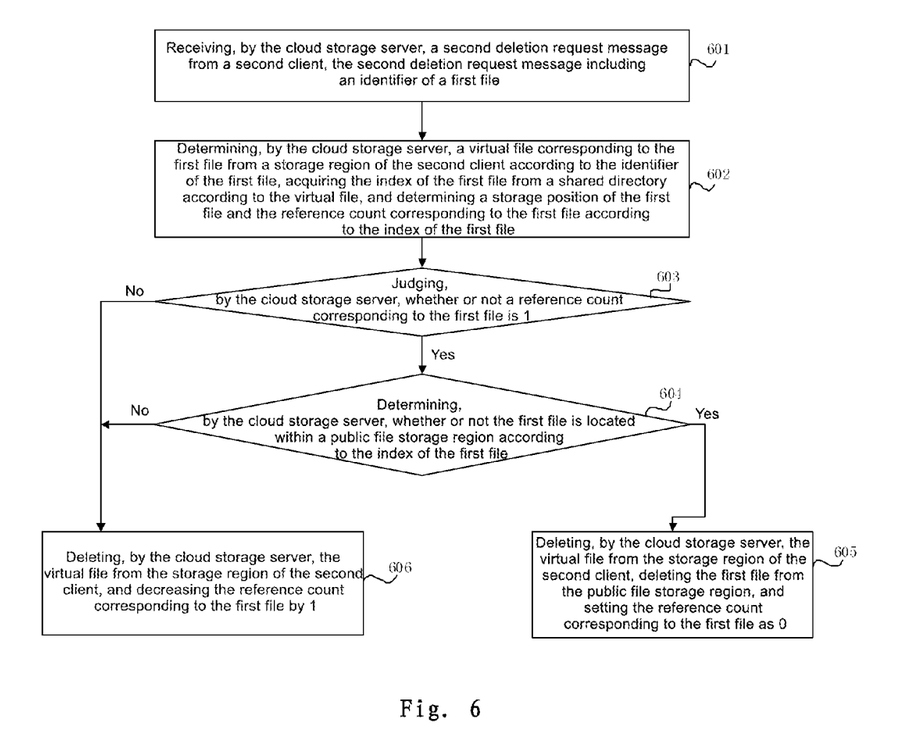
FIG. 6 is a flow chart of yet another method for processing a shared file according to one embodiment of the present invention.

The method for processing the shared file according to the embodiments of the present invention includes, apart from uploading, downloading and updating the first file, a step of deleting the first file. The first client that uploads the first file may delete the first file, and the second client that shares the first file may also delete the first file, although with different procedures for the deletion. FIG. 5 shows the procedure of deleting the first file by the first client. This procedure is performed after the procedure uploading the first file by the first client, and there is no particular order between it and the procedures of downloading and updating the first file by the second client. FIG. 6 shows the procedure of deleting the first file by the second client. This procedure is performed after the procedure of downloading the first file by the second client, and there is no particular order between it and the procedure of updating the first file by the second client.

As shown in FIG. 5, the procedure of deleting the first file by the first client comprises the following steps.

Step 501: receiving, by the cloud storage server, a first deletion request message from the first client, the first deletion request message including the identifier of the first file.

Step 502: acquiring, by the cloud storage server, a reference count corresponding to the first file according to the identifier of the first file, judging whether or not the reference count is 0, if yes, i.e., if the reference count is 0, proceeding to step 503, and if not, i.e., if the reference count is greater than 0, proceeding to step 504.

Step 503: directly deleting, by the cloud storage server, the first file from the storage region of the first client, and deleting the index of the first file from the shared directory.

If the reference count corresponding to the first file is 0, it means that there is no other client that shares the first file, so the first file may be directly deleted, and the index of the first file may also be deleted from the shared directory.

Step 504: moving, by the cloud storage server, the first file from the storage region of the first client to a public file storage region, and modifying the index of the first file within the shared directory so that the modified index points to the first file within the public file storage region.

If the reference count corresponding to the first file is greater than 0, it means that there is another client that shares the first file, and at this time, the cloud storage sever cannot directly delete the first file. The cloud storage server may set the public file storage region, and move the first file to be deleted from the storage region of the first client to the public file storage region, so as to store the first file temporarily. Meanwhile, the cloud storage server may modify the index of the first file within the shared directory, so that the amended index still points to the first file, specifically points to the first file within the public file storage region, so that the other client that makes reference to the first file, e.g., the second client, can delete the first file based on the modified index.

As shown in FIG. 6, the procedure of deleting the first file by the second client comprises the following steps.

Step 601: receiving, by the cloud storage server, a second deletion request message from the second client, the second deletion request message including the identifier of the first file.

Step 602: determining, by the cloud storage server, the virtual file corresponding to the first file from the storage region of the second client according to the identifier of the first file, acquiring the index of the first file from the shared directory according to the virtual file, and determining the storage position of the first file and the reference count corresponding to the first file according to the index of the first file.

Step 603: judging, by the cloud storage server, whether or not the reference count corresponding to the first file is 1, if yes, proceeding to step 604, and if not, i.e., if the reference count corresponding to the first file is greater than 1, proceeding to steps 606.

Step 604: determining, by the cloud storage server, whether or not the first file is located within the public file storage region according to the index of the first file, if yes, proceeding to step 605, and if not, i.e., if it is determined that the first file is located within the storage region of the first client according to the index of the first file, proceeding to steps 606.

Step 605: deleting, by the cloud storage server, the virtual file from the storage region of the second client, deleting the first file from the public file storage region, and setting the reference count corresponding to the first file as 0.

If the reference count corresponding to the first file is 1, it means that merely the second client shares the first file. If the second client deletes the first file, there is no any other client to share the first file. At this time, the cloud storage server needs to set the reference count corresponding to the first file to 0. In addition, if the cloud storage server determines that the first file is located within the public file storage region according to the index of the first file, it means that the first client has deleted the first file, and the first file is temporarily stored within the public file storage region because it is still shared by the second client. When the second client also deletes the first file, the first file will no longer be necessary. Hence, the cloud storage server may directly delete the first file from the public file storage region, and delete the virtual file corresponding to the first file from the storage region of the second client.

Step 606: deleting, by the cloud storage server, the virtual file from the storage region of the second client, and decreasing the reference count corresponding to the first file by 1.

If the reference count corresponding to the first file is greater than 1, it means that, apart from the second client, there is other client(s) that may also share the first file. At this time, although the second client has deleted the first file, in order to ensure that the other client can still correctly share the first file, no matter whether the first file is located within the public file storage region or the storage region of the first client, the cloud storage server merely deletes the virtual file corresponding to the first file from the storage region of the second client and decreases the reference count corresponding to the first file by 1, without deleting the first file.

Alternatively, if it is determined that the first file is located within the storage region of the first client according to the index of the first file, it means that the first client does not delete the first file. At this time, no matter whether the reference count corresponding to the first file is 1 or greater than 1, the cloud storage server merely deletes the virtual file corresponding to the first file from the storage region of the second client, and decreases the reference count corresponding to the first file by 1, without deleting the first file.

According to the above embodiments, not only the procedure of updating the shared file, but also the procedures of uploading, downloading and deleting the shared file are provided, i.e., a complete procedure of processing the shared file is provided. As a result, it is able to share the file in the cloud storage system.

Figure 7:
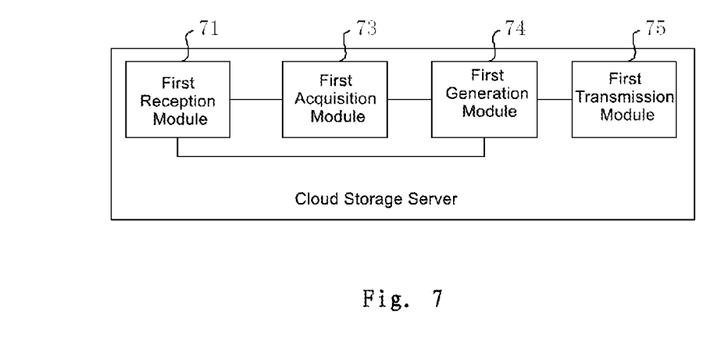
FIG. 7 is a schematic structure diagram showing a cloud storage server according to one embodiment of the present invention.

FIG. 7 is a schematic structure diagram showing a cloud storage server according to one embodiment of the present invention. As shown in FIG. 7, the cloud storage server 70 comprises:

a first reception module 71 configured to receive an update request message from a second client, the update request message including an identifier of a first file that is requested to be updated and local version information of the first file, the first file being downloaded by the second client from a storage region of a first client;

a first acquisition module 72 coupled to the first reception module 71 and configured to determine that the first file is located within the storage region of the first client according to the identifier of the first file received by the first reception module 71, and acquire current version information of the first file from the storage region of the first client;

a first generation module 73 coupled to the first reception module 71 and the first acquisition module 72, and configured to, if it is determined, according to the local version information of the first file received by the first reception module 71 and the current version information of the first file acquired by the first acquisition module 72, that the version of the first file on the second client is older than the version of the first file within the storage region of the first client, generate a first download address for the first file; and a first transmission module 74 coupled to the first generation module 73 and configured to transmit the first download address generated by the first generation module 73 to the second client, so that the second client downloads the first file in the current version from the storage region of the first client according to the first download address.

Alternatively, when the first acquisition module 72 determines that the first file is located within the storage region of the first client according to the identifier of the first file received by the first reception module, the first acquisition module 72 is specifically configured to determine a virtual file corresponding to the first file from a storage region of the second client according to the identifier of the first file received by the first reception module 71, acquire an index of the first file from a shared directory according to the virtual file, and determines that the first file is located within the storage region of the first client according to the index of the first file. The virtual file is generated by the cloud storage server according to the index of the first file in the shared directory during downloading the first file by the second client. The index of the first file points to the first file. The virtual file and the index of the first file include the identifier of the first file respectively, and indices of the files allowed to be shared are stored in the shared directory.

Figure 8:
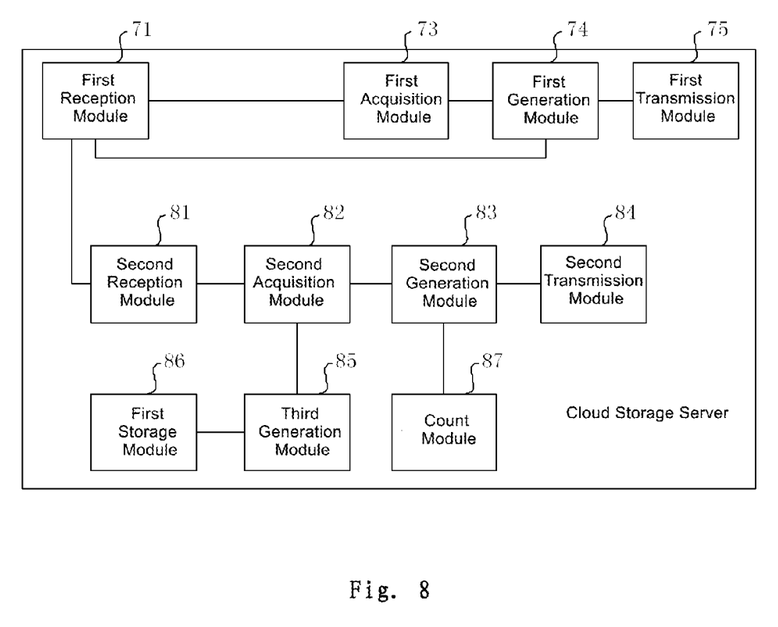
FIG. 8 is a schematic structure diagram showing another cloud storage server according to one embodiment of the present invention.

As shown in FIG. 8, the cloud storage server further comprises:

a second reception module 81 alternatively coupled to the first reception module 71, and configured to, before the first reception module 71 receives the update request message, receive a download request message from the second client, the download request message including the identifier of the first file requested to be downloaded;

a second acquisition module 82 coupled to the second reception module 81 and configured to acquire the index of the first file from the shared directory according to the identifier of the first file received by the second reception module 81;

a second generation module 83 coupled to the second acquisition module 82, and configured to determine that the first file is located within the storage region of the first client according to the index of the first file acquired by the second acquisition module 82 and generate a second download address for the first file; and a second transmission module 84 coupled to the second generation module 83, and configured to transmit the second download address for the first file generated by the second generation module 83 to the second client, so that the second client downloads the first file from the storage region of the first client according to the second download address.

As shown in FIG. 8, the cloud storage server further comprises:

a third generation module 85 coupled to the second acquisition module 82 and configured to, after the second acquisition module 82 acquires the index of the first file, generate the virtual file corresponding to the first file according to the index of the first file acquired by the second acquisition module 82;

a first storage module 86 coupled to the third generation module 85 and configured to store the virtual file generated by the third generation module 85 in the storage region of the second client; and a count module 87 coupled to the second generation module 83 and configured to, after the second generation module 83 determines that the first file is located within the storage region of the first client, increase a reference count corresponding to the first file by 1.

Figure 9:
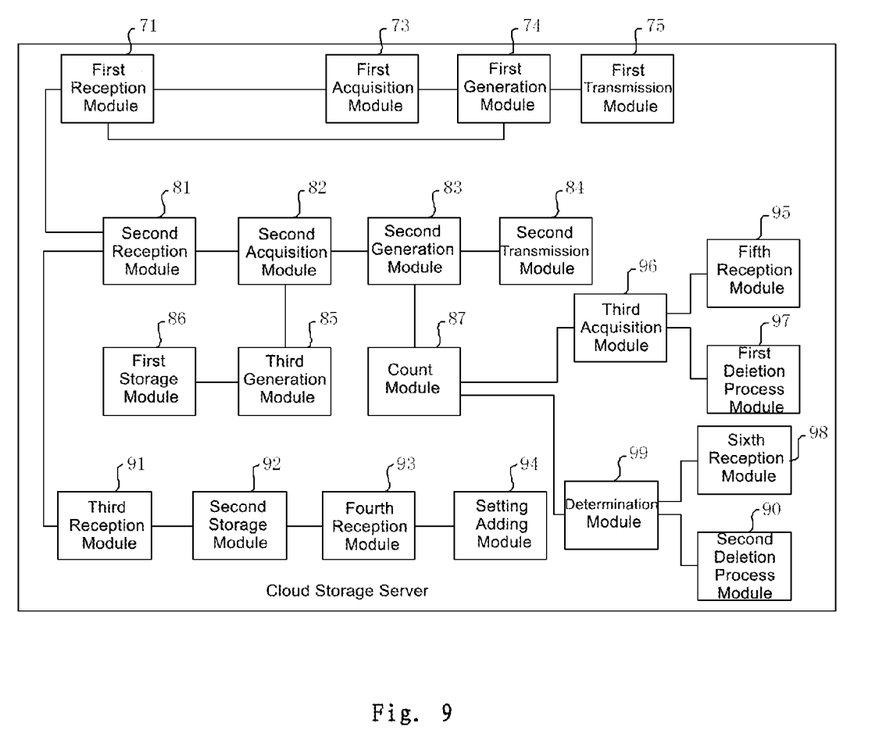
FIG. 9 is a schematic structure diagram showing yet another cloud storage server according to one embodiment of the present invention.

As shown in FIG. 9, the cloud storage server further comprises:

a third reception module 91 alternatively coupled to the second reception module 81, and configured to, before the second reception module 81 receives the download request message, receive an upload request message from the first client, the upload request message including the first file;

a second storage module 92 coupled to the third reception module 91 and configured to store the first file received by the third reception module 91 in the storage region of the first client;

a fourth reception module 93 coupled to the second storage module 92 and configured to, after the second storage module 92 stores the first file in the storage region of the first client, receive a share request message from the first client, the share request message including the identifier of the first file; and a setting adding module 94 configured to set a share identifier for the first file within the storage region of the first client according to the identifier of the first file received by the fourth reception module 93, and add the index of the first file to the shared directory.

As shown in FIG. 9, the cloud storage server further comprises:

a fifth reception module 95 configured to receive a first deletion request message from the first client, the first deletion request message including the identifier of the first file;

a third acquisition module 96 coupled to the fifth reception module 95 or alternatively coupled to the count module 87, and configured to acquire the reference count corresponding to the first file according to the identifier of the first file received by the fifth reception module 95; and a first deletion process module 97 coupled to the third acquisition module 96 and configured to, if the reference count acquired by the third acquisition module 96 is 0, directly delete the first file from the storage region of the first client and delete the index of the first file from the shared directory, and if the reference count acquired by the third acquisition module 96 is greater than 0, move the first file from the storage region of the first client to a public file storage region and modify the index of the first file in the shared directory, so that the modified index points to the first file in the public file storage region.

As shown in FIG. 9, the cloud storage server further comprises:

a sixth reception module 98 configured to receive a second deletion request message from the second client, the second deletion request message including the identifier of the first file;

a determination module 99 coupled to the sixth reception module 98 or alternatively coupled to the count module 87, and configured to determine the virtual file corresponding to the first file within the storage region of the second client according to the identifier of the first file received by the sixth reception module 98, acquire the index of the first file from the shared directory according to the virtual file, and determine the storage position of the first file and the reference count corresponding to the first file according to the index of the first file; and a second deletion process module 90 coupled to the determination module 99, and configured to, if the reference count corresponding to the first file determined by the determination module 99 is 1 and the determination module 99 determines that the first file is located within the public file storage region according to the index of the first file, delete the virtual file from the storage region of the second client, delete the first file from the public file storage region and set the reference count corresponding to the first file as 0, and if the reference count corresponding to the first file determined by the determination module 99 is greater than 1 or the determination module 99 determines that the first file is located within the storage region of the first client according to the index of the first file, delete the virtual file from the storage region of the second client and decrease the reference count corresponding to the first file by 1.

The above functional modules of the cloud storage server may be used to execute the procedures as shown in FIGS. 1-6. The operating principles may refer to the procedures of the method mentioned above, and will not be repeated herein.

In this embodiment, the cloud storage server receives the update request message carrying the identifier of the first file that is requested to be updated and the local version information of the first client from the second client, determines that the first file is located within the storage region of the first client according to the identifier of the first file, and acquires the current version information of the first file from the storage region of the first client. Then, the cloud storage server compares the local version information and the current version information of the first file, determine whether the version of the first file on the second client is older than the version of the first file within the storage region of the first client. If yes, it generates the download address used for updating the first file and provides it to the second client, so that the second client downloads the file in the current version according to the download address, thereby to update the shared file.

It should be appreciated that, all or parts of the steps of the method may be performed by hardware associated with program instructions. The program may be stored in a computer-readable storage medium. When executing the program, the above steps of the method will be executed too. The storage medium comprises various media that can store program codes, such as a ROM, a RAM, a disk or an optical disk.

The above embodiments are merely for illustrative purpose, but shall not be construed as limiting the present invention. It should be noted that, a person skilled in the art may make further modifications or equivalent substitutions without departing from the principle of the present invention, and these modifications and substitutions shall also be considered as the scope of the present invention.

What is claimed is:

1. A method for processing a shared file, comprising the steps of:
   receiving, by a cloud storage server, an update request message from a second client, the update request message including an identifier of a first file that is requested to be updated and local version information of the first file;
   determining, by the cloud storage server, that the first file is located within a storage region of a first client according to the identifier of the first file, and acquiring current version information of the first file from the storage region of the first client; and
   determining, by the cloud storage server, according to the local version information and the current version information of the first file, that the version of the first file on the second client is older than the version of the first file within the storage region of the first client; and
   generating, by the cloud storage server, in response to determining that the version of the first file on the second client is older than the version of the first file within the storage region of the first client, a first download address for a current version of the first file and transmitting the first download address to the second client, wherein the first download address is a direct download address for the first file which facilitates the second client directly downloading the current version of the first file from the storage region of the first client according to the first download address;
   wherein the method further comprises:
   receiving, by the cloud storage server, a deletion request message from the first client, the deletion request message including the identifier of the first file;
   acquiring, by the cloud storage server, a reference count corresponding to the first file according to the identifier of the first file; and
   if the reference count is 0, directly deleting, by the cloud storage server, the first file from the storage region of the first client, and deleting the index of the first file from the shared directory; or
   if the reference count is greater than 0, moving, by the cloud storage server, the first file from the storage region of the first client to a public file storage region, and modifying the index of the first file within the shared directory so that the modified index points to the first file within the public file storage region.

2. The method according to claim 1, wherein determining that the first file is located within the storage region of the first client according to the identifier of the first file further comprises:
   determining, by the cloud storage server, a virtual file corresponding to the first file from a storage region of the second client according to the identifier of the first file, the virtual file being generated by the cloud storage server according to an index of the first file in a shared directory during downloading of the first file by the second client, the index of the first file pointing to the first file, the virtual file and the index of the first file including the identifier of the first file respectively, and indices of files allowed to be shared being stored in the shared directory; and
   acquiring, by the cloud storage server, the index of the first file from the shared directory according to the virtual file, and determining, according to the index of the first file, that the first file is located within the storage region of the first client.

3. The method according to claim 2, wherein before receiving the update request message from the second client, the method further comprises:
   receiving, by the cloud storage server, a download request message from the second client, the download request message including the identifier of the first file that is requested to be downloaded;
   acquiring, by the cloud storage server, the index of the first file from the shared directory according to the identifier of the first file, determining that the first file is located within the storage region of the first client according to the index of the first file, and generating a second download address for the first file; and
   transmitting, by the cloud storage server, the second download address for the first file to the second client to facilitate the second client downloading the first file from the storage region of the first client according to the second download address.

4. The method according to claim 3, wherein after acquiring the index of the first file from the shared directory according to the identifier of the first file, the method further comprises:
   generating, by the cloud storage server, the virtual file corresponding to the first file according to the index of the first file, and storing the virtual file into the storage region of the second client; and
   wherein after determining that the first file is located within the storage region of the first client according to the index of the first file, the method further comprises:
   increasing, by the cloud storage server, a reference count corresponding to the first file by 1.

5. The method according to claim 3, wherein before receiving the download request message from the second client, the method further comprises:
   receiving, by the cloud storage server, an upload request message from the first client, the upload request message including the first file;
   storing, by the cloud storage server, the first file in the storage region of the first client;
   receiving, by the cloud storage server, a share request message from the first client, the share request message including the identifier of the first file; and
   setting, by the cloud storage server, a share identifier for the first file within the storage region of the first client according to the identifier of the first file, and adding the index of the first file into the shared directory.

6. A method for processing a shared file, comprising the steps of:
receiving, by a cloud storage server, an update request message from a second client, the update request message including an identifier of a first file that is requested to be updated and local version information of the first file;
determining, by the cloud storage server, that the first file is located within a storage region of a first client according to the identifier of the first file, and acquiring current version information of the first file from the storage region of the first client; and
determining, by the cloud storage server, according to the local version information and the current version information of the first file, that the version of the first file on the second client is older than the version of the first file within the storage region of the first client; and
generating, by the cloud storage server, in response to determining that the version of the first file on the second client is older than the version of the first file within the storage region of the first client, a first download address for a current version of the first file and transmitting the first download address to the second client, wherein the first download address is a direct download address for the first file which facilitates the second client directly downloading the current version of the first file from the storage region of the first client according to the first download address;
wherein the method further comprises:
receiving, by the cloud storage server, a deletion request message from the second client, the deletion request message including the identifier of the first file;
determining, by the cloud storage server, a virtual file corresponding to the first file from the storage region of the second client according to the identifier of the first file, acquiring an index of the first file from a shared directory according to the virtual file, and determining a storage position of the first file and a reference count corresponding to the first file according to the index of the first file; and
if the reference count corresponding to the first file is 1 and it is determined that the first file is located within a public file storage region according to the index of the first file, deleting, by the cloud storage server, the virtual file from the storage region of the second client, deleting the first file from the public file storage region, and setting the reference count corresponding to the first file as 0; or
if the reference count corresponding to the first file is greater than 1 or it is determined that the first file is located within the storage region of the first client according to the index of the first file, deleting, by the cloud storage server, the virtual file from the storage region of the second client and decreasing the reference count corresponding to the first file by 1.

7. A cloud storage server, comprising a non-transitory computer-readable medium having processor-executable instructions stored thereon for processing a shared file, the processor-executable instructions, when executed, facilitating performance of the following:
receiving an update request message from a second client, the update request message including an identifier of a first file that is requested to be updated and local version information of the first file;
determining that the first file is located within a storage region of a first client according to the identifier of the first file, and acquiring current version information of the first file from the storage region of the first client;
if it is determined, according to the local version information of the first file and the current version information of the first file, that the version of the first file on the second client is older than the version of the first file within the storage region of the first client, generating a first download address for a current version of the first file; and
transmitting the first download address to the second client, wherein the first download address is a direct download address for the first file which facilitates the second client directly downloading the current version of the first file from the storage region of the first client according to the first download address;
wherein the processor-executable instructions, when executed, further facilitate:
receiving a deletion request message from the first client, the deletion request message including the identifier of the first file;
acquiring a reference count corresponding to the first file according to the identifier of the first file;
if the reference count is 0, directly deleting the first file from the storage region of the first client and deleting the index of the first file from the shared directory; and
if the reference count is greater than 0, moving the first file from the storage region of the first client to a public file storage region and modifying the index of the first file in the shared directory, so that the modified index points to the first file in the public file storage region.

8. The cloud storage server according to claim 7, wherein determining that the first file is located within the storage region of the first client according to the identifier of the first file further comprises:
determining a virtual file corresponding to the first file from a storage region of the second client according to the identifier of the first file;
acquiring an index of the first file from a shared directory according to the virtual file; and
determining that the first file is located within the storage region of the first client according to the index of the first file;
wherein the virtual file is generated by the cloud storage server according to the index of the first file in the shared directory during downloading of the first file by the second client, the index of the first file points to the first file, the virtual file and the index of the first file include the identifier of the first file respectively, and indices of files allowed to be shared are stored in the shared directory.

9. The cloud storage server according to claim 8, wherein the processor-executable instructions, when executed, further facilitate, before receiving the update request message:
receiving a download request message from the second client, the download request message including the identifier of the first file that is requested to be downloaded;
acquiring the index of the first file from the shared directory according to the identifier of the first file;
determining that the first file is located within the storage region of the first client according to the index of the first file and generating a second download address for the first file; and
transmitting the second download address for the first file to the second client to facilitate the second client downloading the first file from the storage region of the first client according to the second download address.

10. The cloud storage server according to claim 9, wherein the processor-executable instructions, when executed, further facilitate, after acquiring the index of the first file:
- generating the virtual file corresponding to the first file according to the index of the first file; and
- storing the virtual file into the storage region of the second client; and wherein the processor-executable instructions, when executed, further facilitate, after determining that the first file is located within the storage region of the first client:
- increasing a reference count corresponding to the first file by 1.

11. The cloud storage server according to claim 9, wherein the processor-executable instructions, when executed, further facilitate, before receiving the download request message:
- receiving an upload request message from the first client, the upload request message including the first file;
- storing the first file into the storage region of the first client;
- receiving a share request message from the first client, the share request message including the identifier of the first file; and
- setting a share identifier for the first file within the storage region of the first client according to the identifier of the first file, and adding the index of the first file into the shared directory.

12. A cloud storage server, comprising a non-transitory computer-readable medium having processor-executable instructions stored thereon for processing a shared file, the processor-executable instructions, when executed, facilitating performance of the following:
- receiving an update request message from a second client, the update request message including an identifier of a first file that is requested to be updated and local version information of the first file;
- determining that the first file is located within a storage region of a first client according to the identifier of the first file, and acquiring current version information of the first file from the storage region of the first client;
- if it is determined, according to the local version information of the first file and the current version information of the first file, that the version of the first file on the second client is older than the version of the first file within the storage region of the first client, generating a first download address for a current version of the first file; and
- transmitting the first download address to the second client, wherein the first download address is a direct download address for the first file which facilitates the second client directly downloading the current version of the first file from the storage region of the first client according to the first download address;

wherein the processor-executable instructions, when executed, further facilitate:
- receiving a deletion request message from the second client, the deletion request message including the identifier of the first file;
- determining a virtual file corresponding to the first file from the storage region of the second client according to the identifier of the first file, acquiring an index of the first file from a shared directory according to the virtual file, and determining a storage position of the first file and a reference count corresponding to the first file according to the index of the first file;
- if the reference count corresponding to the first file is 1 and the first file is located within a public file storage region according to the index of the first file, deleting the virtual file from the storage region of the second client, deleting the first file from the public file storage region and setting the reference count corresponding to the first file as 0; and
- if the reference count corresponding to the first file is greater than 1 or the first file is located within the storage region of the first client according to the index of the first file, deleting the virtual file from the storage region of the second client and decreasing the reference count corresponding to the first file by 1.

* * * * *